United States Patent [19]

Kitamura

[11] Patent Number: 5,037,231
[45] Date of Patent: Aug. 6, 1991

[54] JOINT DEVICE FOR CONNECTING TWO ROTATABLE MEMBERS

[75] Inventor: Yoshiharu Kitamura, Komagane, Japan

[73] Assignee: NHK Spring Co., Ltd., Yokohama, Japan

[21] Appl. No.: 450,059

[22] Filed: Dec. 12, 1989

[30] Foreign Application Priority Data

Dec. 21, 1988 [JP] Japan .............................. 63-165570[U]

[51] Int. Cl.⁵ ............................................. F16C 11/00
[52] U.S. Cl. ...................................... 403/120; 403/111;
403/165; 403/166; 403/325; 403/330; 16/299;
16/307; 16/308
[58] Field of Search ................ 403/111, 120, 164–166,
403/325, 330; 16/277, 298, 299, 319, 337, 339,
76–77, 305, 307, 308

[56] References Cited

U.S. PATENT DOCUMENTS

| | | | |
|---|---|---|---|
| 308,537 | 11/1884 | Walsh | 16/305 |
| 340,790 | 4/1886 | Kochsmeier | 16/305 X |
| 384,102 | 6/1888 | Warner | 16/305 X |
| 466,031 | 12/1891 | Eiflander | 16/305 X |
| 623,367 | 4/1899 | Hanington | 16/305 X |
| 1,095,966 | 5/1914 | Hayden | 403/311 X |
| 1,194,628 | 8/1916 | Hist | 16/305 X |
| 1,417,084 | 5/1922 | Maier | 16/305 |
| 1,847,822 | 3/1932 | Denton | 16/76 X |
| 2,626,421 | 1/1953 | Lyons | 16/305 X |
| 2,812,522 | 11/1957 | Wilson | 16/305 |
| 2,823,413 | 2/1958 | Stewart | 16/76 |
| 3,029,454 | 4/1962 | Short et al. | 403/111 X |
| 3,459,462 | 8/1969 | Barnard et al. | 16/305 X |
| 4,356,594 | 11/1982 | Grosemans | 16/307 X |
| 4,439,946 | 4/1984 | Altier | 16/76 X |

Primary Examiner—Randolph A. Reese
Assistant Examiner—Franco S. De Liguori
Attorney, Agent, or Firm—Frishauf, Holtz, Goodman & Woodward

[57] ABSTRACT

A joint device, wherein a shaft is supported by a base member, and can rotate in a first direction and a second direction. Two coil springs are mounted on the shaft. The first coil spring has an end fixed to the base member. The inner diameter of the first coil spring is smaller than the outer diameter of the shaft. The first coil spring is wound around the shaft in the first direction. The first coil spring is wound tightly around the shaft when the shaft is rotated in the first direction. An arm is attached to the shaft. The arm twists the free end of the first coil spring in the second direction, whereby a return torque is accumulated in the first coil spring. The second coil spring also has an end fixed to the base member. The free end of the second coil spring is twisted when the shaft is rotated in the second direction, whereby a return torque is accumulated in the second coil spring.

6 Claims, 6 Drawing Sheets

JOINT DEVICE FOR CONNECTING TWO ROTATABLE MEMBERS

BACKGROUND OF THE INVENTION

1. Field of the Invention

The present invention relates to a joint device for connecting two members which are incorporated in an apparatus and which can rotate relative to each other.

2. Description of the Related Art

A laptop word-processor or a laptop personal computer comprises a main body and a rotatable display unit. The display unit is attached at one side to the main body by a hinge mechanism and is therefore rotatable. Once the unit is bent down onto the main body, it is held in a closed position by means of a lock mechanism.

The hinge mechanism includes a friction member which applies a friction force on the display unit which has been opened, thereby holding the unit at a desired angle relative to the main body. The hinge mechanism may also include a spring which exerts a return torque on the display unit immediately after the unit has been moved up a little from the closed position, thereby quickly rotating the unit upward until the unit reaches a position where it is inclined to the main body at a predetermined angle.

Recently it is increasingly demanded that the laptop apparatuses be made thinner. The thinner they become, the less space is provided for accommodating the hinge mechanism. Hence, it is required that the friction member and the spring be as small as possible. If the friction member and the spring are as small as desired, they may fail to generate an adequate friction force and a sufficient return torque, respectively.

SUMMARY OF THE INVENTION

Accordingly, it is the first object of the present invention to provide a joint device which can apply a proper torque on a rotatable member.

Further, the second object of the invention is to provide a joint device which can exert an appropriate friction force between two members rotatable relative to each other.

According to the present invention, there is provided a joint device which has a relatively small diameter and can, nevertheless, generate a proper torque and an appropriate friction force. The joint device is designed to connect a first member to a second member rotatable relative to the first member, and comprises:

at least one base member fastened to the first member;
a shaft supported by the base member, capable of rotating in a first direction and also in a second direction opposite to the first direction, and having a first portion, a second portion, and a connecting portion connected to the second member;
a first spring having a fixed end set in engagement with the base member, a free end, and a coil portion connecting the fixed and free ends and wound in the first direction around the first portion of the shaft, the inner diameter of the coil portion being smaller than that of the first portion of the shaft when the coil portion is in a free condition;
a first means coupled to the shaft, for moving the free end of the first spring when the shaft is rotated in the second direction, to thereby twist the coil portion of the first spring in the second direction;
a second spring having a fixed end set in engagement with the base member, a free end, and a coil portion connecting the fixed and free ends and located at the second portion of the shaft, the inner diameter of the coil portion being greater than that of the second portion of the shaft when the coil portion is in a free condition; and
a second means coupled to the shaft, for moving the free end of the second spring when the shaft is rotated in the second direction, to thereby twist the coil portion of the second spring in the second direction.

DETAILED DESCRIPTION OF THE PREFERRED EMBODIMENTS

Figure 3:
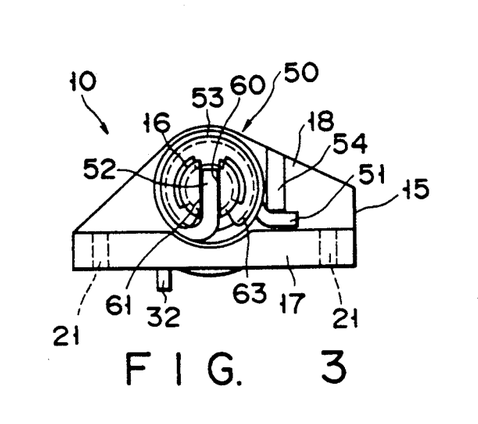
FIG. 3 is a left-side view representing the joint device illustrated in FIG. 1.
Figure 4:
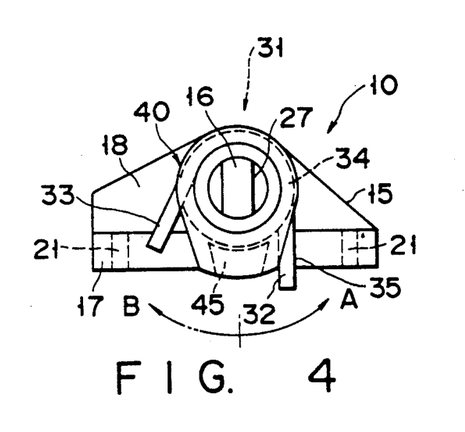
FIG. 4 is a right-side view of the device shown in FIG. 1.
Figures 5, 6, 7:
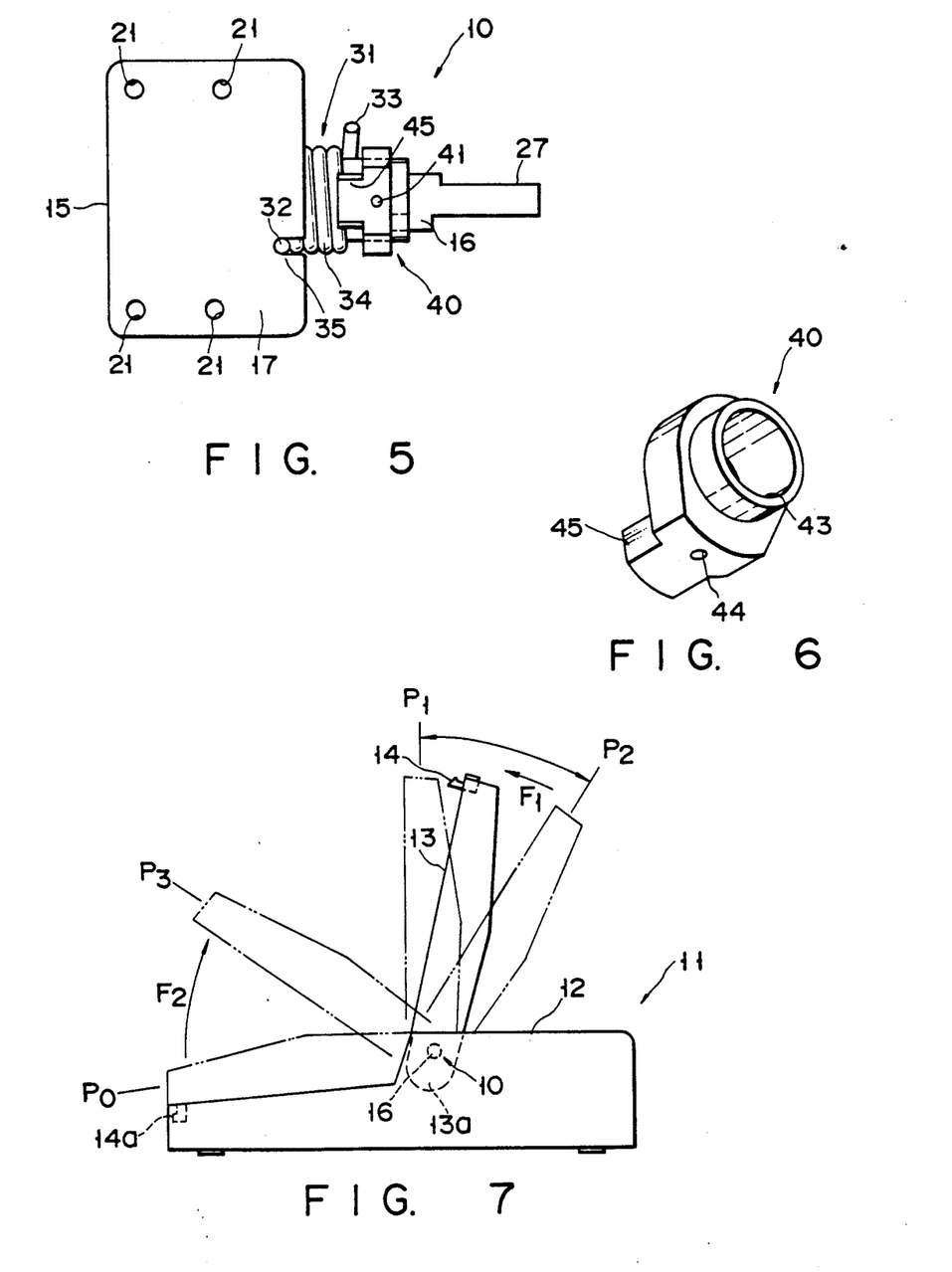
FIG. 5 is a bottom view of the joint device shown in FIG. 1.
FIG. 6 is a perspective view illustrating the arm member incorporated in the joint device shown in FIG. 1.
FIG. 7 is a side view of an apparatus in which the joint device shown in FIG. 1 is incorporated.

A joint device 10, which is the first embodiment of the present invention, will now be described with reference to FIGS. 1 to 6. As is shown in FIG. 7, two identical joint devices 10 are used in an apparatus 11 such as a laptop word-processor or a laptop personal computer. The apparatus 11 comprises a main body 12 and a display unit 13. The joint devices 10 connect the display unit 13 to the main body 12 such that the unit 13 can be rotated from a closed position P0 to an open position P2. The display unit 13 is held in the closed position P0 since the hook of a lock mechanism 14 is latched in the engagement section 14a of the main body 12. Needless to say, the joint device can be used in any apparatus other than a laptop word-processor and a laptop personal computer that has at least two members rotatable relative to each other.

Figure 1:
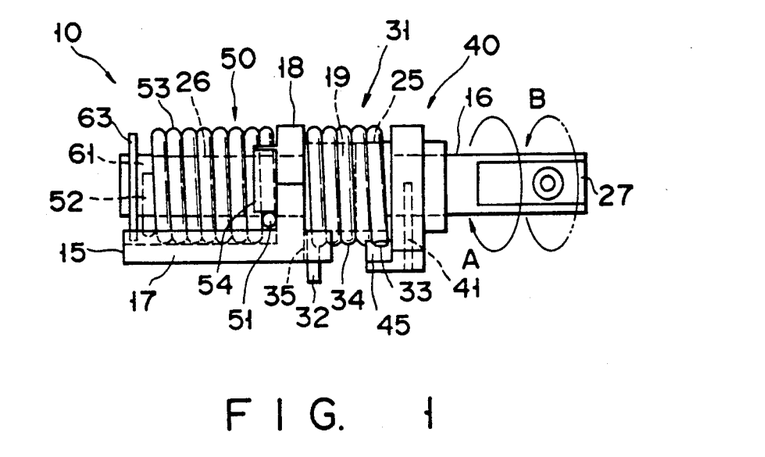
FIG. 1 is a front view illustrating a joint device according to a first embodiment of the present invention.

Either joint device 10 comprises a base member 15 and a shaft 16 as is illustrated in FIG. 1. The base member 15 has a base 17 and a vertical wall 18 connected to one end of the base 17. A hollow-cylindrical bearing 19 is fitted in the vertical wall 18 and has a through hole 20. As is best shown in FIG. 5, the base 17 also has several holes 21. As is illustrated in FIG. 7, the base member 15 is fastened to the base 13a of the display unit 13 by means of screws (not shown) which pass through the holes 21.

The shaft 16 extends through the hole 20 of the bearing 19 fitted in the vertical wall 18 of the base member 15. The shaft 16 can rotate in a first direction, or in the direction of arrow A shown in FIGS. 1 and 4, and also in a second direction, or in the direction of arrow B shown in FIGS. 1 and 4. As may be best shown in FIG. 2, the shaft 16 comprises a first portion 25, a second portion 26, and a connecting portion 27. The connecting portion 27 is coupled to the main body 12 of the apparatus 11. The first portion 25, which is a solid cylinder, has an outer diameter nearly equal to that of the bearing 19. As is evident from FIG. 4, the connecting portion 27 has a substantially rectangular cross section.

Figure 2:
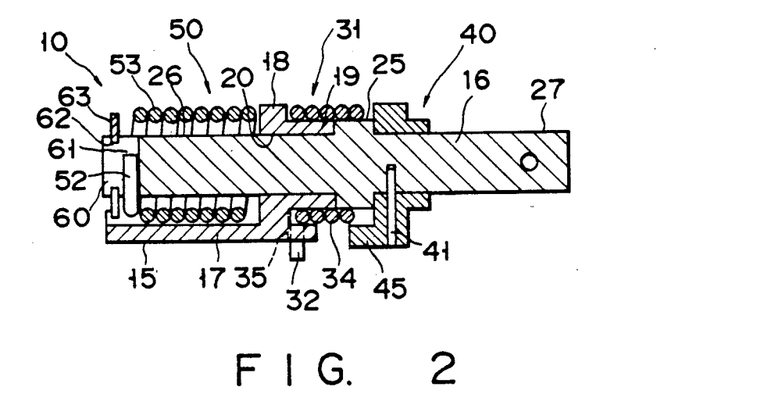
FIG. 2 is a cross-sectional view showing the joint device illustrated in FIG. 1.

As is shown in FIGS. 1 and 2, either joint device 10 further comprises two coil springs 31 and 50 which are wound around the first portion 25 and second portion 26 of the shaft 16, respectively. The first spring 31 comprises a fixed end 32, a free end 33, and a coil portion 34 connecting the ends 32 and 33. The fixed end 32 extends tangentially to the circumference of the coil portion 34. As is shown in FIG. 4, the fixed end 32 is fixed in a hole 35 in the base member 15. The coil portion 34 is wound around the first portion 25 and also the bearing 19, in a first direction of rotation, or in the direction of arrow A shown in FIG. 1. When the coil portion 34 is in an unbiased condition, its inner diameter is smaller than the outer diameter of the first portion 25 of the shaft 16 prior to being fitted over the first portion 25 of the shaft 16. Therefore, the inner circumference of the coil portion 34 is in tight contact with the outer circumference of the first portion 25 of the shaft 16. The free end 33 of the first coil spring 31 extends tangentially to the circumference of the coil portion 34.

As is illustrated in FIGS. 1 and 2, an arm 40 is attached to the shaft 16 by means of a pin 41. The arm 40 is specifically shaped as is shown in FIG. 6. It has a through hole 43, a hole 44, and a projection 45. The shaft 16 extends through the hole 43, and the pin 41 is inserted in the hole 44. The projection 45 protrudes in such a direction as to abut on the free end 33 of the first coil spring 31 when the arm 40 is rotated in a second direction of rotation, or in the direction of arrow B shown in FIG. 1.

As has been described, the second coil spring 50 is wound around the second portion 26 of the shaft 16. The second coil spring 50 comprises a fixed end 51, a free end 52, and a coil portion 53 connecting the ends 51 and 52. The fixed end 51 is bent outwardly in the radial direction of the coil 50 and engages with a spring receiving portion 54 formed on the base member 15. When the coil portion 53 is in an unbiased condition, its inner diameter is greater than the outer diameter of the second portion 26 of the shaft 16. The free end 52 of the second coil spring 50 extends inward in the radial direction of the coil portion 53.

As is shown in FIG. 2, a second projection 61 is integrally formed with the end of the shaft 16. The second projection 61 has a slit 60 extending in the direction of the diameter of the shaft 16 as is shown in FIG. 3. The free end 52 of the second coil spring 50 is fitted in the slit 60. The second projection 61 also has an annular groove 62 in its circumference. A ring 63 is fitted in the annular groove 62, preventing the free end 52 of the shaft 16 from slipping out of the slit 60.

It will now be explained how either joint device 10 operates. When the shaft 16 is rotated in the first direction A, a friction force is generated between the first portion 25 of the shaft 16 and the coil portion 34 of the first spring 31. Due to this friction force, the coil portion 34 is twisted in the first direction A. As a result, the coil portion 34 is wound more tightly around the first portion 25 of the shaft 16. The friction force between the first portion 25 and the coil portion 34 thereby increases and becomes strong enough to hold the display unit 13 at any position between the vertical position P1 and the rearward inclined position P2, both illustrated in FIG. 7.

Meanwhile, the coil portion 53 of the second coil spring 50 is twisted in the first direction A when the shaft 16 is rotated in the first direction A. A return torque is thereby generated to bias the shaft 16 in the second direction B. If this torque is applied in the direction of arrow F1 in FIG. 7, the display unit 13 can be prevented from rotating downward toward the position P2 by its own weight.

When the shaft 16 is rotated in the second direction B, the first projection 45 of the arm 40 eventually goes into abutment with the free end 33 of the first coil spring 31. As the free end 33 rotates in the second direction B, the coil portion 34 of the first spring 31 is twisted in the second direction B. Hence, a return torque is generated in the coil portion 34 to rotate the shaft 16 backward in the first direction A. At this time, the coil portion 34 expands in its radial direction. In other words, its diameter becomes greater than when it is in the unbiased condition. Meanwhile, a return torque is generated also in the coil portion 53 of the second coil spring 50 when the shaft 16 is rotated in the second direction B, thereby twisting the free end 52 of the second coil spring 50 in the same direction. This return torque also acts to rotate the shaft 16 in the first direction A. The return torques generated in the coil springs 31 and 50, both acting in the first direction A, are used as force F2 for rotating up the display unit 13 from the closed position P0 to an intermediate position P3 (see FIG. 7).

Figure 8:
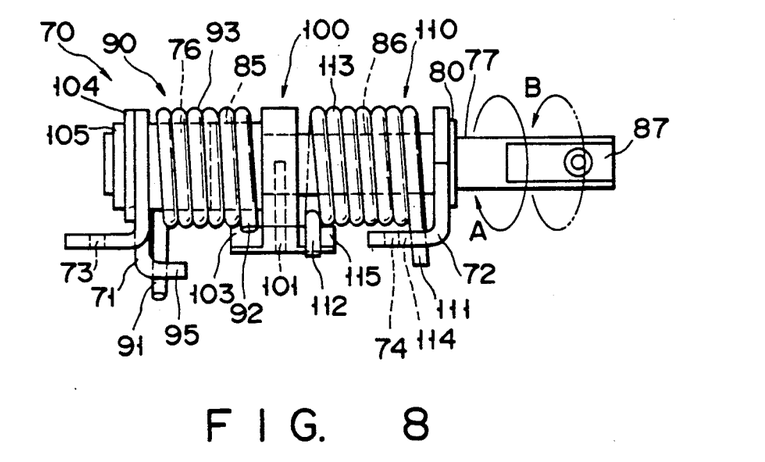
FIG. 8 is a front view illustrating a joint device according to a second embodiment of the present invention.
Figure 9:
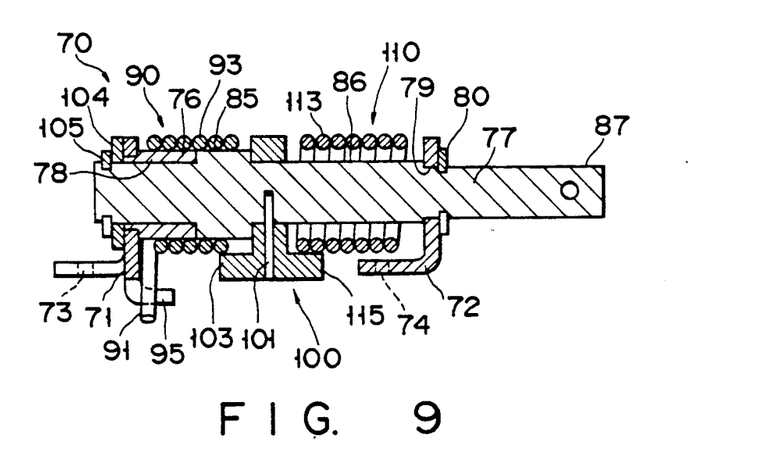
FIG. 9 is a sectional view of the device shown in FIG. 8.
Figure 10:
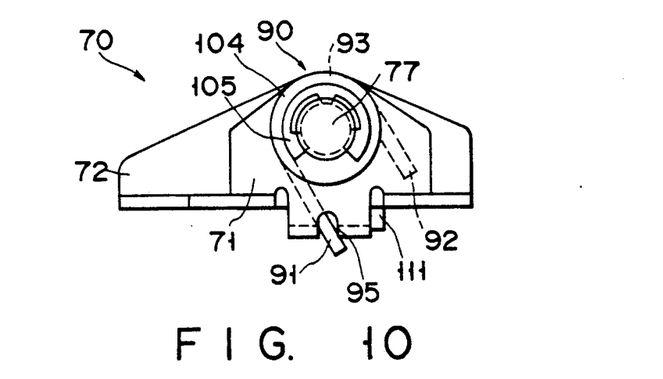
FIG. 10 is a left-side view of the device shown in FIG. 8.

With reference to FIGS. 8 to 12, a joint device 70 which is the second embodiment of the invention will be described. As is shown in FIGS. 8 and 9, this joint device 70 comprises two base members 71 and 72 and a shaft 77. As is clearly illustrated in FIG. 12, the base member 71 has holes 73, and the base member 72 has holes 74. A hollow cylindrical bearing 76 is fitted to the base member 71. The bearing 76 has a through hole 78. The base member 72 also has a through hole 79. The shaft 77 passes through the holes 78 and 79. As is best shown in FIG. 9, the shaft 77 has an annular groove in the portion which is located just outside the base member 72. A ring 80 is fitted in the annular groove, thus restricting the axial movement of the shaft 77. Both base members 71 and 72 are fastened to the main body 12 of the apparatus 11 (FIG. 7) by means of screws (not shown) inserted in the holes 73 and 74.

Figure 11:
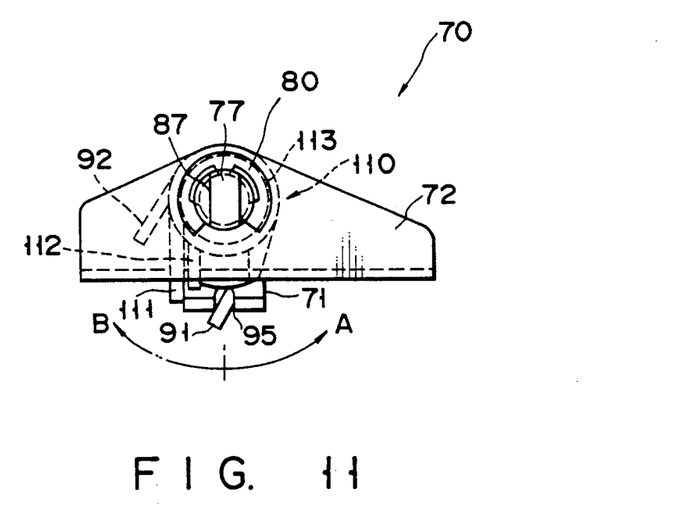
FIG. 11 is a right-side view of the device shown in FIG. 8.
Figure 12:
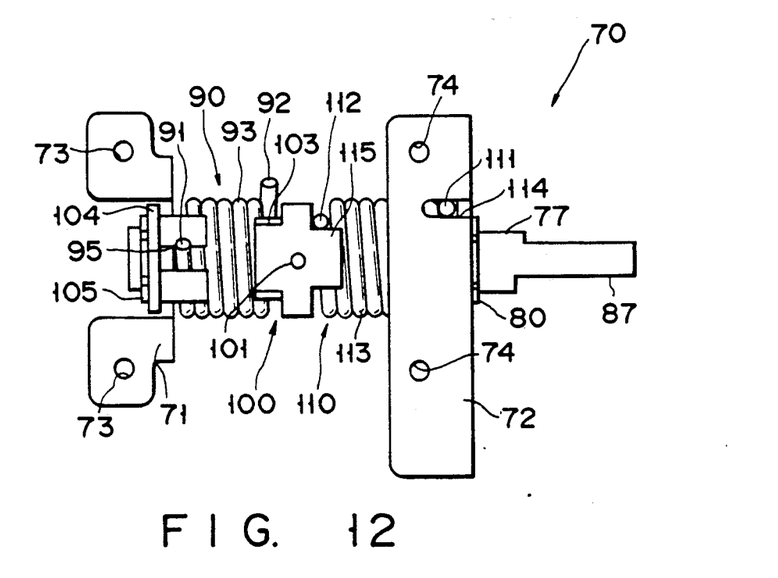
FIG. 12 is a bottom view of the device shown in FIG. 8.

The shaft 77 is supported by the base members 71 and 72, such that it can rotate in a first direction and a second direction which are indicated by arrows A and B in FIGS. 8 and 11. The shaft 77 comprises a first portion 85, a second portion 86, and a connecting portion 87. The first portion 85, which is a solid cylinder, has an outer diameter equal to that of the bearing 76.

As is shown in FIGS. 8 and 9, joint device 70 further comprises two coil springs 90 and 110 which are wound around the first portion 85 and second portion 86 of the shaft 77, respectively. The first spring 90 comprises a fixed end 91, a free end 92, and a coil portion 93 connecting the ends 91 and 92. The fixed end 91 extends tangentially to the circumference of the coil portion 93. As is shown in FIG. 11, the fixed end 91 is fixed in a hole 95 in the base member 71. The coil portion 93 is wound around the first portion 85 and also the bearing 76, in a first direction of rotation, or in the direction of arrow A shown in FIG. 8. When the coil portion 93 is in an unbiased condition, its inner diameter is smaller than the outer diameter of the first portion 85 of the shaft 77 prior to being fitted over the first portion 85 of the shaft 77. The free end 92 of the first coil spring 90 extends tangentially to the circumference of the coil portion 93.

As is illustrated in FIGS. 8 and 9, an arm 100 is attached to the shaft 77 by means of a pin 101. The arm 100 has a projection 103 at one end. The projection 103 protrudes in such a direction as to abut on the free end 92 of the first coil spring 90 when the arm 100 is rotated in a second direction of rotation, or in the direction of arrow B shown in FIG. 8. The base member 71 is held by a washer 104 and a ring 105, and thus is prevented from slipping from the end of the shaft 77.

As has been described, the second coil spring 110 is wound around the second portion 86 of the shaft 77. The second coil spring 110 comprises a fixed end 111, a free end 112, and a coil portion 113 connecting the ends 111 and 112. The fixed end 111 is fixed in a hole 114 in the base member 71. When the coil portion 113 is in an unbiased condition, its inner diameter is larger than the outer diameter of the second portion 86 of the shaft 77. The free end 112 of the second coil spring 110 is bent around a second projection 115 protruding from the end of the arm 100.

The operation of the joint device 70 will now be explained. When the shaft 77 is rotated in the first direction A, a friction force is generated between the first portion 85 of the shaft 77 and the coil portion 93 of the first spring 90. Due to this friction force, the coil portion 93 is twisted in the first direction A. As a result, the coil portion 93 is wound more tightly around the first portion 85 of the shaft 77. The friction force between the first portion 85 and the coil portion 93 thereby increases.

When the shaft 77 is rotated in the second direction B, the first projection 103 of the arm 100 eventually goes into abutment with the free end 92 of the first coil spring 90. The coil portion 93 of the first spring 90 is twisted in the second direction B. Hence, a return torque is generated in the coil portion 93 to rotate the shaft 77 reversely in the first direction A. In the meantime, a return torque is generated also in the coil portion 113 of the second coil spring 110 when the shaft 77 is rotated in the second direction B. This return torque acts to rotate the shaft 77 reversely in the first direction A.

Thus, the two coil springs 90 and 110 cooperate to generate a great return torque.

Figure 13:
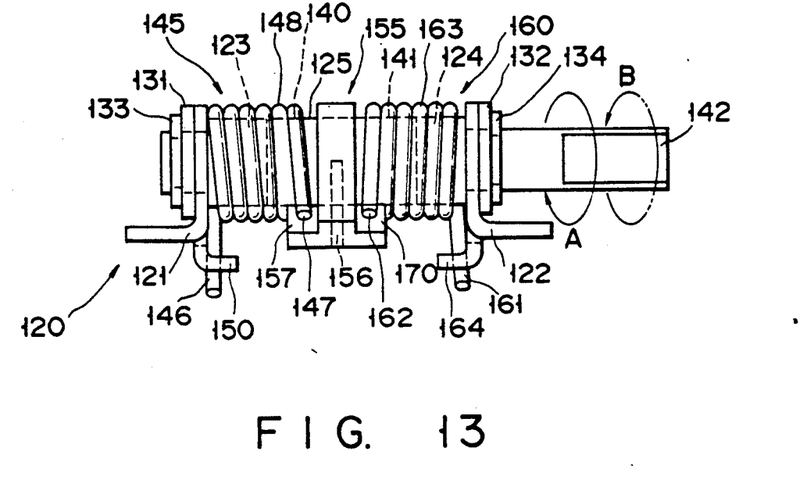
FIG. 13 is a front view illustrating a joint device according to a third embodiment of the present invention.
Figure 14:
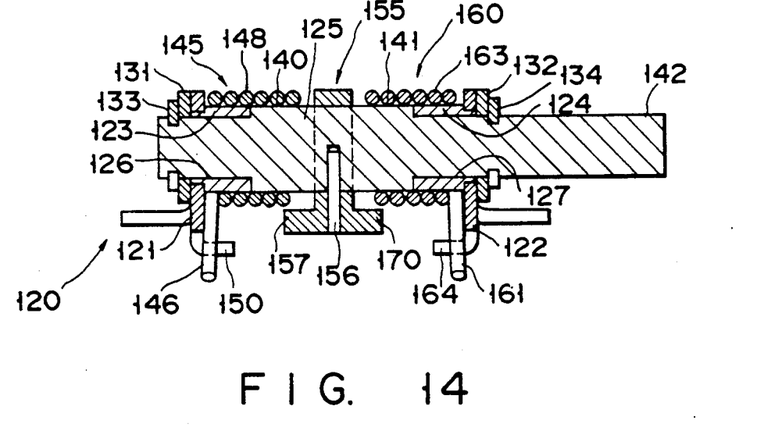
FIG. 14 is a sectional view of the device shown in FIG. 13.
Figure 15:
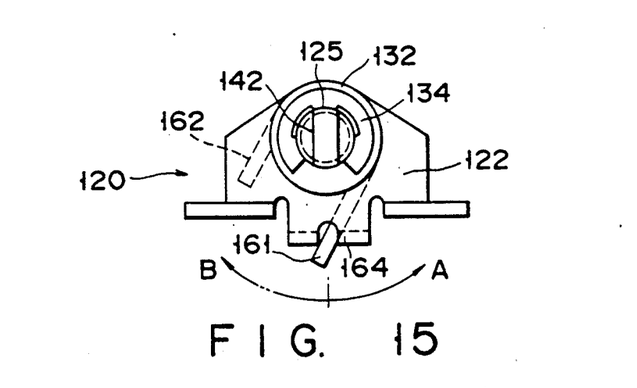
FIG. 15 is a right-side view of the device shown in FIG. 13.

With reference to FIGS. 13 to 15, a joint device 120 which is the third embodiment of the invention will be described. As is shown in FIGS. 13 and 14, this joint device 120 comprises two base members 121 and 122 and a shaft 125. Hollow cylindrical bearings 123 and 124 are fitted to the base members 121 and 122, respectively. The bearing 123 has a through hole 126, and the bearing 124 has a through hole 127. The shaft 125 extends through the holes 126 and 127. A washer 131 prevents the base member 121 from moving in the axial direction. Similarly, a washer 132 prevents the base member 122 from moving in the axial direction. A ring 133 prevents the shaft 125 from moving in the axial direction.

The shaft 125 is supported by the base members 123 and 124, such that it can rotate in a first direction and a second direction which are indicated by arrows A and B in FIG. 15. The shaft 125 comprises a first portion 140, a second portion 141, and a connecting portion 142. The first portion 141 and the second portion 142, either being a solid cylinder, have an outer diameter equal to that of the bearings 123 and 124.

The joint device 120 further comprises two coil springs 145 and 160 which are wound around the first portion 140 and second portion 141 of the shaft 125, respectively. The first spring 145 comprises a fixed end 146, a free end 147, and a coil portion 148 connecting the ends 146 and 147. As is shown in FIGS. 13 and 14, the fixed end 146 is fixed in a hole 150 in the base member 121. The coil portion 148 is wound around the first portion 140 and also the bearing 123 in the first direction A. When the coil portion 148 is in an unbiased condition, its inner diameter is smaller than the outer diameter of the first portion 140 of the shaft 125. The free end 147 of the first coil spring 145 extends tangentially to the circumference of the coil portion 148.

As is illustrated in FIGS. 13 and 14, an arm 155 is attached to the shaft 125 by means of a pin 156. The arm 155 has a projection 157 at one end. The projection 157 protrudes in such a direction as to abut on the free end 147 of the first coil spring 145 when the arm 155 is rotated in the second direction B.

As has been described, the second coil spring 160 is wound around the second portion 141 of the shaft 125. The second coil spring 160 comprises a fixed end 161, a free end 162, and a coil portion 163 connecting the ends 161 and 162. The fixed end 161 is fixed in a hole 164 in the base member 122. The coil portion 163 is wound around the second portion 141 of the shaft 125 and the bearing 124, in the first direction A. The coil portion 163 is wound in the direction opposite to the winding direction of the coil portion 148 of the first spring 145. When the coil portion 163 is in an unbiased condition, its inner diameter is smaller than the outer diameter of the second portion 141 of the shaft 125. The free end 162 of the second coil spring 160 extends tangentially to the circumference of the coil portion 163 of the second coil spring 160. The coil portion 163 has the same diameter as that of the coil portion 148 of the first spring 145.

The arm 155 has a second projection 170 at one end. The projection 170 protrudes in such a direction as to abut on the free end 162 of the second coil spring 160 when the arm 155 is rotated in the second direction B.

The operation of the joint device 120 will now be explained. When the shaft 125 is rotated in the first direction A, a friction is generated between the first portion 140 of the shaft 125 and the coil portion 148 of the first spring 145, and also between the second portion 141 of the shaft 125 and the coil portion 163 of the second spring 160. Due to this friction force, the coil portions 148 and 163 are twisted in the first direction A. As a result, the coil portions 148 and 163 are wound more tightly around the portions 140 and 141 of the shaft 125, respectively. The friction force between the first portion 140 and the coil portion 148 and the friction force between the second portion 141 and the coil portion 163 thereby increase.

When the shaft 125 is rotated in the second direction B, the projections 157 and 170 abut onto the free end 147 of the first coil spring 145 and the free end 162 of the second coil spring 160, respectively. The coil portions 148 and 163 are therefore twisted in the second direction B. Hence, a return torque is generated in either coil portion to rotate the shaft 125 reversely in the first direction A. Thus, the two coil springs 145 and 160 cooperate to generate a great return torque.

Figure 16:
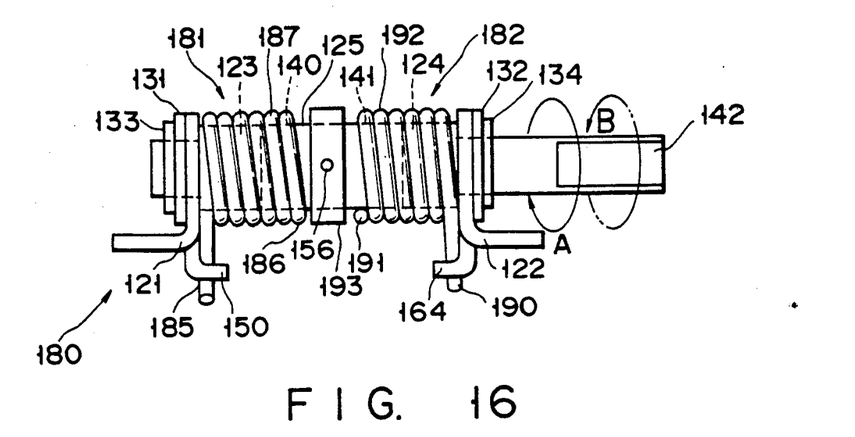
FIG. 16 is a front view illustrating a joint device according to a fourth embodiment of the present invention.
Figure 17:
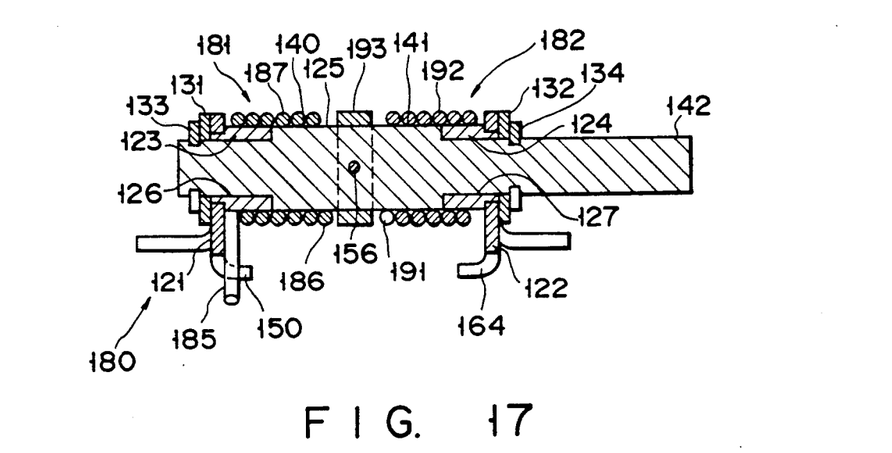
FIG. 17 is a sectional view showing the joint device illustrated in FIG. 16.
Figure 18:
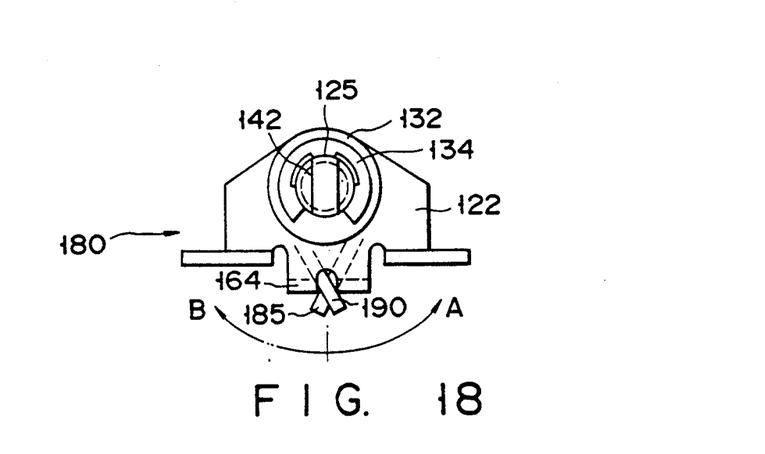
FIG. 18 is a right-side view of the device shown in FIG. 16.

With reference to FIGS. 16 to 18, a joint device 180 which is the fourth embodiment of the invention will be described. This joint device 180 is identical in structure to the device 120 shown in FIGS. 13 to 15, except in the following respects. Hence, in FIGS. 16 to 18, the same and like components are designated by the same numerals a those used in FIGS. 13 to 15, and will not be described in detail.

The joint device 180 comprises two coil springs 181 and 182. The springs 181 and 182 are wound around the first and second portions 140 and 141 of the shaft 125. The first coil spring 181 comprises a fixed end 185, a free end 186, and a coil portion 187 connecting the ends 185 and 186. As is shown in FIGS. 16 and 17, the fixed end 185 is fixed in a hole 150 in the base member 121. The second coil spring 182 comprises a fixed end 190 a free end 191, and a coil portion 192 connecting the ends 190 and 191. The fixed end 190 is fixed in a hole 164 in the base member 122. The coil springs 181 and 182 have the same diameter, and are wound around the shaft 125 in the same direction. A spacer 193 is mounted on and fixed to the shaft 125 by means of a pin 156, and is located between the first coil spring 181 and the second coil spring 182.

In operation, when the shaft 125 is rotated in the first direction A as is shown in FIG. 16, the coil portion 187 of the coil spring 181 is wound tightly around the first portion 140 of the shaft 125. As a result, a great friction force is generated between the shaft 125 and the first spring 181. When the shaft 125 is rotated in the second direction B, the coil portion 192 of the coil spring 182 is wound tightly around the second portion 141 of the shaft 125. A great friction force is thereby generated between the shaft 125 and the second spring 182.

What is claimed is:

1. A joint device for connecting a first member to a second member, such that said second member is rotatable relative to said first member, said joint device comprising:
    a base member fastened to said first member, said base member having a cylindrical bearing portion;
    a shaft supported by said bearing portion of said base member, said shaft being rotatable in a first direction and also in a second direction opposite to said first direction, and said shaft having a first portion, a second portion, and a connecting portion connected to said second member, said first portion of said shaft having an outer diameter substantially equal to the outer diameter of said bearing portion of said base member;
    a first spring having an end fixed to said base member, a free end, and a coil portion connecting said fixed and free ends, said coil portion of said first spring being wound in said first direction around both said first portion of said shaft and said bearing portion of said base member, the inner diameter of said coil portion of said first spring being smaller than said outer diameter of said first portion of said shaft when said coil portion is in a free condition, where said coil portion is not yet fitted around said first portion of said shaft and said coil portion of said first spring having an inner surface which is in contact with said first portion of said shaft when it is fitted around said first portion and being capable of slipping on said first portion of said shaft when said shaft is rotated in said second direction;
    first moving means coupled to said shaft, for moving said free end of said first spring when said shaft is rotated by a predetermined angle in said second direction, to thereby twist said coil portion of said first spring in said second direction;
    a second spring having an end fixed to said base member, a free end, and a coil portion connecting said fixed and free ends of said second spring, said coil portion of said second spring being located at said second portion of said shaft, the inner diameter of said coil portion of said second spring being greater than said outer diameter of said second portion of said shaft when said coil portion of said second spring is in a free condition where said coil portion of said second spring is not yet fitted around said second portion of said shaft; and
    second moving means coupled to said shaft, for moving said free end of said second spring when said shaft is rotated in said second direction, to thereby twist said coil portion of said second spring in said second direction.

2. The joint device according to claim 1, wherein said shaft has a slit in one end thereof, and said free end of said second spring is fitted in said slit of said shaft.

3. The joint device according to claim 1, comprising an arm member located between said first and second portions of said shaft, and said first and second moving means protrude from said arm member.

4. The joint device according to claim 3, wherein said second moving means is located so as to contact said free end of said second spring when said shaft is rotated in said second direction.

5. A joint device for connecting a first member to a second member such that said second member is rotatable relative to said first member, said joint device comprising:
    a base member fastened to said first member, said base member having a pair of cylindrical bearing portions;
    a shaft supported by one of said bearing portions of said base member, said shaft being rotatable in a first direction and also in a second direction opposite to said first direction, and said shaft having a first portion, a second portion, and a connecting portion connected to said second member, said first portion of said shaft having an outer diameter substantially equal to the outer diameter of a bearing portion of said base member;
    a first spring having an end fixed to said base member, a free end, and a coil portion connecting said fixed and free ends, said coil portion of said first spring being wound in said first direction around both said first portion of said shaft and one of said bearing portions of said base member, the inner diameter of said coil portion of said first spring being smaller than said outer diameter of said first portion of said shaft when said coil portion is in a free condition, where said coil portion is not yet fitted around said first portion of said shaft, and said coil portion of said first spring having an inner surface which is in contact with said first portion of said shaft when it is fitted around said first portion and being capable of slipping on said first portion of said shaft when said shaft is rotated in said second direction;

first moving means coupled to said shaft, for moving said free end of said first spring when said shaft is rotated by a predetermined angle in said second direction, to thereby twist said coil portion of said first spring in said second direction;

a second spring having an end fixed to said base member, a free end, and a coil portion connecting said fixed and free ends of said second spring, said coil portion of said second spring being wound in said first direction around both said second portion of said shaft and the other of said bearing portions of said base member, the inner diameter of said coil portion of second spring being smaller than said outer diameter said second portion of said shaft when said coil portion of said second spring is in a free condition where said coil portion of said second spring is not yet fitted around said second portion of said shaft, said coil portion of said second portion of said shaft when it is fitted around said second portion and being capable of slipping on said second portion of said shaft when said shaft is rotated in said second portion; and second moving means coupled to said shaft, for moving said free end of said second spring when said shaft is rotated in said second direction, to thereby twist said coil portion of said second spring in said second direction.

6. The joint device according to claim 5, wherein said coil portion of said first spring and said coil portion of said second spring are wound in opposite directions, an arm member is located between said first and second portions of said shaft, and said first and second moving means comprise projections which protrude from said arm member.

* * * * *